Oct. 3, 1950 R. C. GOERTZ 2,524,051
FULL-WAVE, PHASE-SENSITIVE DEMODULATOR
Filed Nov. 5, 1946 2 Sheets-Sheet 1

INVENTOR.
RAYMOND C. GOERTZ
BY
Herbert H. Thompson
his Attorney

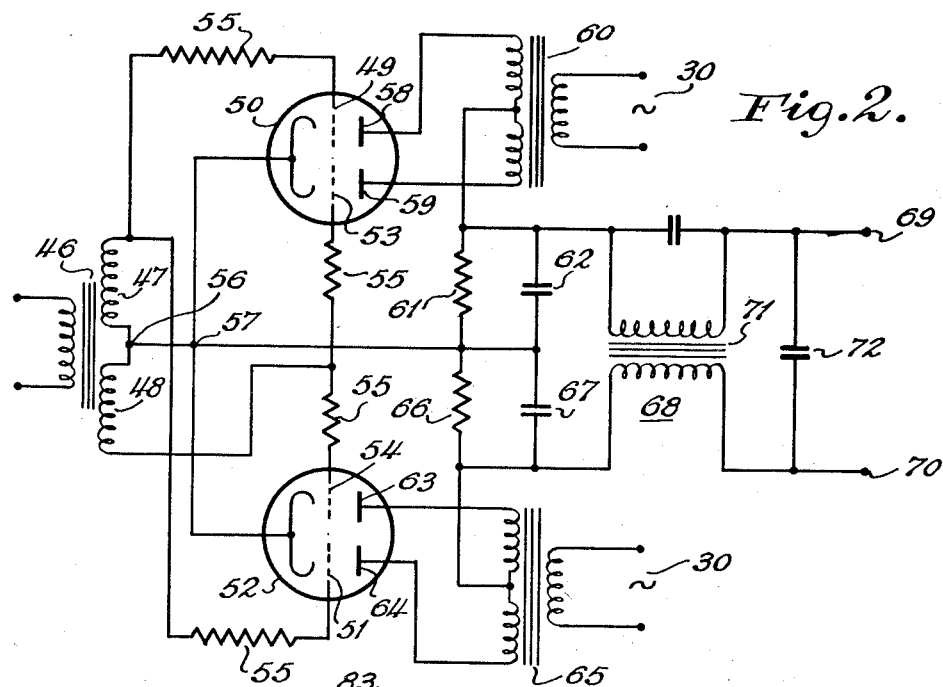
*Fig. 2.*
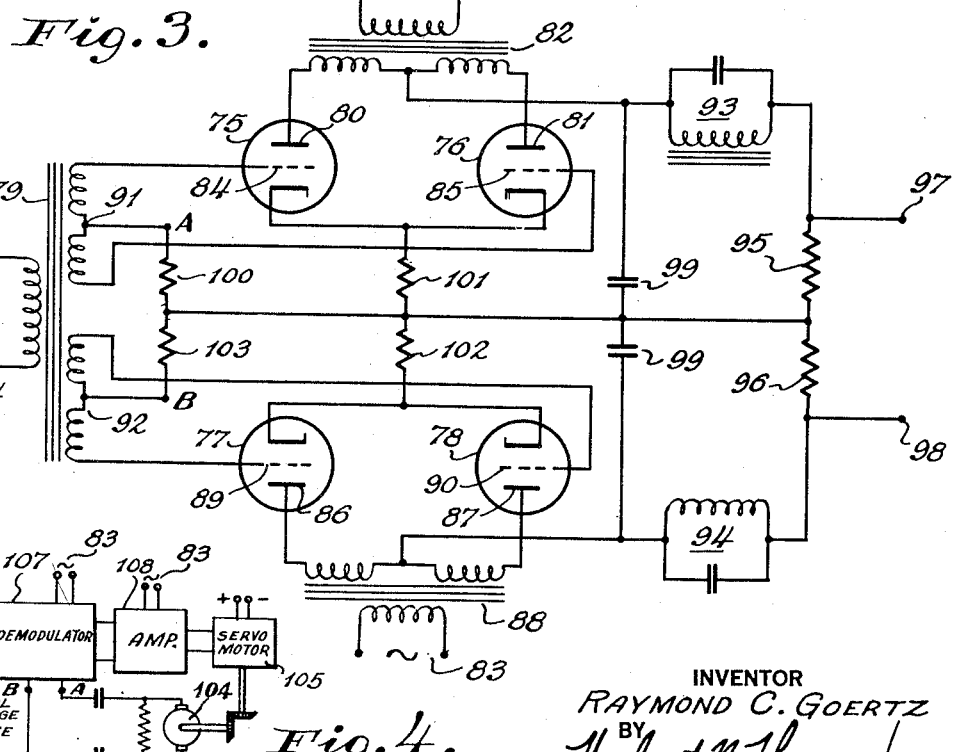
*Fig. 3.*
*Fig. 4.*
INVENTOR
RAYMOND C. GOERTZ
BY
Herbert R. Thompson
his ATTORNEY.

Patented Oct. 3, 1950

2,524,051

UNITED STATES PATENT OFFICE 2,524,051

FULL-WAVE, PHASE-SENSITIVE DEMODULATOR

Raymond C. Goertz, Hempstead, N. Y., assignor to The Sperry Corporation, a corporation of Delaware Application November 5, 1946, Serial No. 707,953

9 Claims. (Cl. 318—28)

1

My invention relates to demodulators and particularly to phase-sensitive, full wave demodulators which are adapted for use in servomotor control circuits.

The present application is a continuation-in-part of pending application Serial No. 403,618 filed in the United States Patent Office on July 23, 1941, and which issued on January 14, 1947 as U. S. Patent No. 2,414,102. In that application, one form of the present invention is disclosed as embodied in a servomotor control circuit which controls a prediction motor or a device functioning to provide compensated data or to correct the data which is applied to a remote point for controlling the directing of a gun. In other words, as described in said application Serial No, 403,618, the data (target orientation in azimuth and elevation) obtained from a sight is corrected to provide desired prediction data whereby although the sight is operated to track the target, the gun will be directed toward the future position of the target or toward that point in space at which the target should arrive simultaneously with a shell fired from the gun, sometimes called "shell burst position." In the present case, therefore, I have shown the novel demodulator of the present invention as embodied in a servomotor control circuit for use in operating a prediction motor mainly for exemplary purposes.

A principal object of the present invention resides in providing an improved demodulator circuit for converting alternating voltages into direct voltages whose polarity and magnitude correspond to the phase and magnitude of the alternating voltages.

Another object resides in providing a demodulator of the foregoing character which is of a phase-sensitive, full wave character, providing full wave demodulation and which is particularly adapted for use in a servomotor control system.

A still further object resides in providing a full wave demodulator of the foregoing character comprising a tuned filter in the output thereof which is designed to provide substantially a pure unidirectional voltage or one having low alternating or ripple content without substantial delay of said unidirectional voltage in following variations in amplitude of the input alternating voltage.

Still another object resides in providing a full wave demodulator which is so constructed and arranged as to permit of mixing an A. C. and a D. C. signal, or input voltages, and to obtain

2 a unidirectional output voltage which is a function of the algebraic sum of the two input voltages.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects reside in providing servomotor systems including control circuits embodying demodulators of the foregoing characters.

With the foregoing and other objects in view, my invention includes the novel elements and the combinations and arrangements thereof described below and illustrated in the accompanying drawings, in which:

Fig. 2 shows in detail the circuit of one embodiment of the full wave, phase-sensitive demodulator of the present invention;

Fig. 3 illustrates a modified form of demodulator; and

Figure 1:
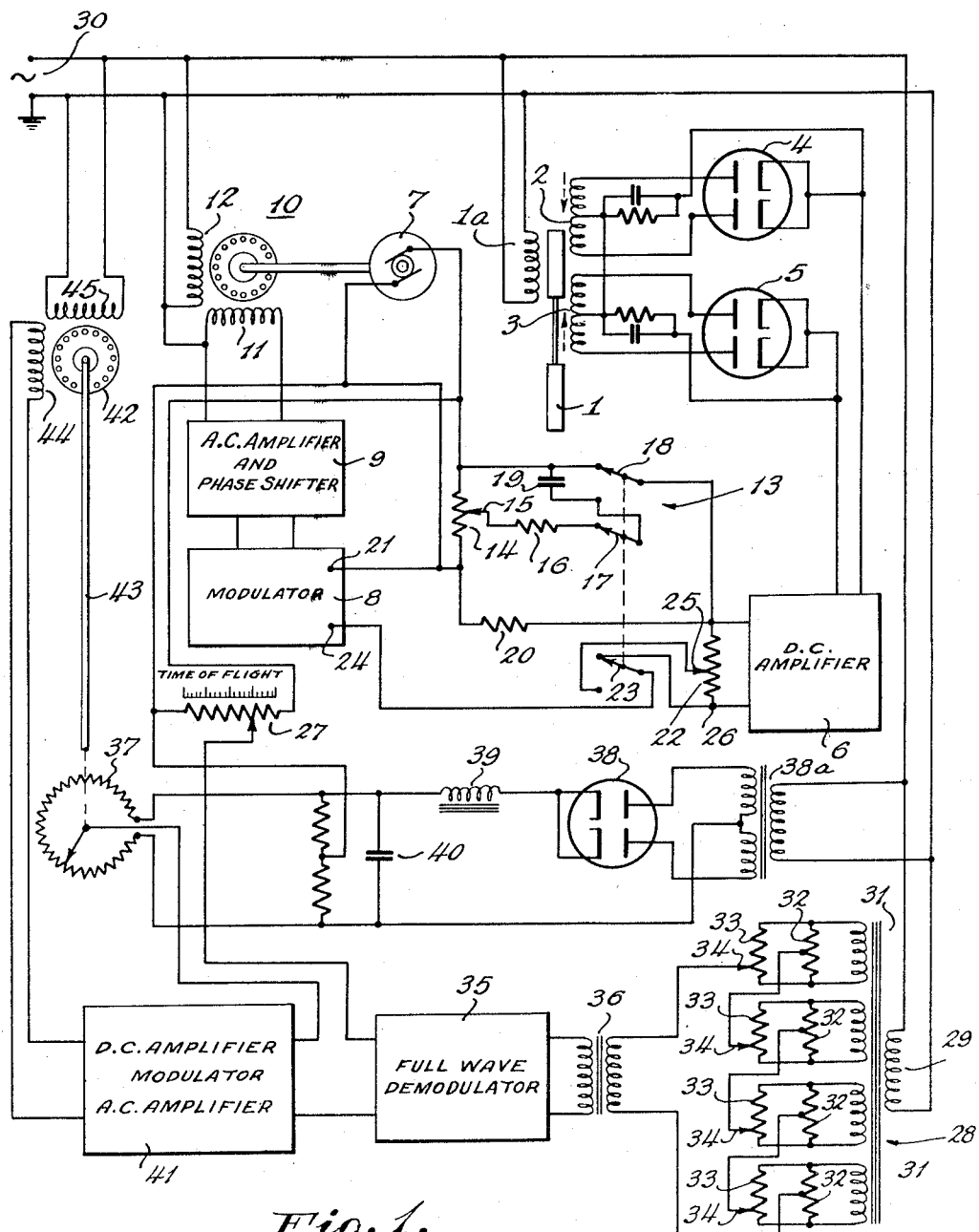
Fig. 1 shows schematically a circuit diagram of a servomotor and control circuit therefor embodying a demodulator of the present invention.

Fig. 4 schematically shows a servo system.

As above indicated, the demodulator of the present invention is particularly adapted for servomotor control purposes, and, in Fig. 1, I have shown an exemplary application of a servomotor and control system therefor wherein a manually operable controller is actuated to control one servo for driving a sight for target tracking purposes, while a second servomotor functions to add correction voltages to the voltages representing azimuth or elevation components of the target position as determined by the sight for the purpose of supplying future position data to the gun controls. In the schematic showing in Fig. 1, it will be understood that I have therein shown only that part of the control system or systems which drives the sight in either elevation or azimuth and corrects or compensates the data for the one plane of operation.

The manual controller comprises a primary or input winding 1a connected across A. C. source 30, pick-up or output windings 2 and 3 and a core of magnetic material which is operated by handle 1 to vary the coupling between winding 1a and windings 2, 3 and thereby provide a voltage output proportional in amplitude to the deflection of the handle and of a phase sense dependent upon the direction in which the handle is deflected from a neutral or zero voltage output position.

Deflection of, or pressure on, control handle 1 generates alternating control voltages in pick-up coils 2, 3. These voltages are rectified in full-wave rectifiers 4, 5 and are then connected in series opposing relation. The dotted arrows near coils 2, 3 indicate the relative polarities of the voltages induced in the coils 2, 3. In place of rectifiers 4, 5, any phase-sensitive rectifier or demodulator may be used. The coils 2, 3 are connected in series opposition to form the input of such a demodulator. A suitable demodulator circuit is shown in Fig. 2.

The resultant direct voltage from the rectifiers 4, 5 (or demodulator of Fig. 2) is applied to the input of D. C. amplifier 6, wherein it is amplified. The output of D. C. amplifier 6 is connected in series bucking relationship to the output of speed generator 7, which is designed to provide a voltage output proportional to its speed. In the embodiment shown, generator 7 is a D. C. generator, either with a permanent magnet field or a field winding, energized by direct current, as will be described. Of course, the voltage output of generator 7 must be directly proportional to its speed.

The combined direct control and speed generator voltages are applied to modulator 8, which transforms the applied direct voltage into an alternating voltage of proportional amplitude, and of a phase corresponding to the polarity of the input. That is, the A. C. output voltage of modulator 8 reverses phase when the D. C. input voltage reverses polarity.

The output of modulator 8 will be an alternating voltage whose phase corresponds to the direction of deflection of control handle 1 and whose amplitude is proportional to the amplitude of the control handle deflection. It will be understood that certain cases may require that this proportionality be not strictly observed. Any suitable relationship may be used. This output is fed into an A. C. amplifier and phase shifter 9 whose output controls the drive or servomotor 10. Phase shifter 9 insures that the energization of field winding 11 of drive motor 10 is in quadrature with that of field winding 12.

Incorporated in the input circuit of modulator 8 is the integrating circuit 13 for effecting velocity plus acceleration tracking control. This circuit comprises a potentiometer 14 connected across the speed generator output and having a movable arm 15 connected through a resistor 16 to the fixed contact of a single-pole single-throw switch 17. Connected across the two fixed contacts of a single-pole double-throw switch 18 is a condenser 19. One terminal of this condenser 19 is connected to a terminal of the speed generator 7, while the other terminal is connected to the movable contact of switch 17. The movable contact of switch 18 is connected to one output terminal of D. C. amplifier 6 and also to a resistor 20 whose other side is connected to the input terminal 21 of modulator 8. Resistor 20 is selected to have a high value of resistance, and to give a large time constant with condenser 19. A potentiometer 22 is connected across the output of D. C. amplifier 6, and a switch 23 can selectively connect the input terminal 24 of modulator 8 to either the movable arm 25 or the fixed terminal 26 of potentiometer 22. The three switches 23, 17, 18 are mechanically ganged so as to be operated simultaneously.

In the switch position shown in Fig. 1, the circuit will operate with straight velocity tracking; that is, the drive motor velocity will be proportional to or will at least correspond to the control handle deflection, as described above. In this position, condenser 19 is charged through current limiting resistor 16 to a voltage somewhat less than the generator voltage, by means of the potentiometer 14. The time constant of the charging circuit 16, 19 is made small so that the condenser voltage will closely follow changes in generator voltage. The charging voltage depends on the position of arm 15 of potentiometer 14.

When switches 17 and 18 are switched to their other positions, the voltage across condenser 19 is placed in opposition to the generator voltage, across resistor 20. The voltage across this resistor 20 will be the generator voltage less the condenser voltage. This difference voltage will be much less than the voltage across potentiometer 22, which at the moment of switching was substantially equal to the generator voltage. In order to prevent abrupt speed change of drive motor 10 due to the excess of the voltage across potentiometer 22 over the voltage across resistor 20, switch 23 is actuated simultaneously with switches 17 and 18, and acts to reduce the effective voltage output of D. C. amplifier 6 to a value nearer the different voltage.

Since the generator output voltage is greater than the charged condenser 19 voltage, the generator 7 will tend to further charge condenser 19, through resistor 20. The voltage drop across resistor 20 produced by this charging current must be substantially equal and opposite to the voltage across the effective part of potentiometer 22; otherwise, the drive motor 10 will speed up or slow down so as to make the drop across resistor 20 have a value equal to that across potentiometer 22. If control handle 1 is held in constant deflected position, a constant voltage will be developed across potentiometer 22. However, the voltage drop across resistor 20 will tend to decrease, since the charging current of condenser 19 will decrease as full charge is approached. The only way in which the voltage drop across resistor 20 can be maintained equal to that across the effective part of potentiometer 22 is for the generator to continually increase velocity to maintain constant charging current. Hence control handle 1 becomes an acceleration control in addition to a velocity control, as it is with the switches 17, 18, 23 in their original position.

From another point of view, the generator voltage V must be equal to the sum of the voltage drop across resistor 20 and condenser 19. That is, $$V = iR + \frac{1}{c} \int i\,dt \qquad (I)$$

where R is the resistance of resistor 20, c is the capacitance of condenser 19 and $i$ is the current flowing in the circuit. It is clear that V is proportional to the tracking speed $s$. Also, the drive motor circuit causes the drop across resistor 20 to be maintained practically equal to the control voltage, which is proportional to deflection D of control handle 1. Hence, $iR$ is proportional to D, or $i$ is proportional to D. Neglecting proportionality constants, the above equation may be transformed into $$s = D + \int D\,dt \tag{II}$$

This last equation shows that the tracking control has both a velocity and an acceleration component. That is, a constant deflection D will give a certain constant component of tracking velocity, as shown by the first term of the right side of the equation, and in addition will give a constantly increasing tracking velocity component due to the integrating effect of the second term. Hence the control handle becomes both a velocity and an acceleration control.

If the control handle 1 is released, so that zero voltage appears across potentiometer 22, the motor will drop its speed until the generator voltage output equals the condenser voltage. Thereafter the motor will travel at constant velocity; if the velocity should change, charging or discharging current from condenser 19 will flow through resistor 20, whose voltage drop will control the motor to restore its speed. The drive motor can be made to slow down only by reversing the deflection of the control handle, which therefore acts again as an acceleration control.

With zero control voltage, D becomes zero, so that the first term of the equation disappears, leaving only the integration term. Hence, S will be maintained constant at the value of the integrated term.

The importance of the combined velocity and acceleration control arises from the methods used in tracking. When an object is sighted, it is desirable to accelerate the sight to overtake the object, and then keep it trained on the object. The present device permits such operation. Acceleration is provided by control handle deflection, whereby the object may be overtaken, then release of the handle 1 will permit the sight to continue tracking at constant velocity.

A further advantage arises where the sight may be tracking by itself at the proper velocity, but behind the object. Then deflection of the control handle will apply enough additional tracking velocity, by the first term of the last equation, to enable the sight to overtake the object. Then release of the handle will permit the sight to resume practically the same tracking velocity as before, since the integration term of the equation will be little affected by the brief period of increased velocity.

Another useful method of operation is to use straight velocity tracking until the object is sighted. Then throwing the ganged switch of Fig. 1 to its other position will automatically continue the same tracking velocity, with the control handle at neutral.

Fig. 1 also shows a D. C. operated prediction control circuit. The time-of-flight prediction voltage, which is proportional to the correction angle needed for time-of-flight correction, is derived from time-of-flight potentiometer 27 connected across the output of speed generator 7. This voltage is a direct voltage since the speed generator output is a direct voltage.

The other prediction voltages may be obtained from a transformer 28 whose primary 29 is energized directly from the alternating supply source 30. Transformer 28 has plural similar secondary windings 31, shown in this instance, for illustrative purposes only, as four in number. Each secondary winding 31 corresponds to one prediction quantity to be compensated for. It will be clear that as many secondary windings may be used as desired.

Each secondary winding 31 is shunted by a center-tapped resistor 32 of high resistance value, and by a potentiometer 33. The variable arm 34 of each potentiometer 33 is controlled in accordance with the value of the quantity for which prediction correction is required, in such fashion that the voltage between each variable arm 34 and its corresponding centertap of resistor 32 is proportional, by the same proportionality factor, to the prediction angle needed for correction of that quantity. This may be accomplished by driving the arms of linear wound potentiometers 33 from the mechanism which computes the required prediction angles, through cams which yield the required relationship, or by using direct drive and non-linear wound potentiometers 33 which will also yield the proper voltage-angle relationship. A suitable system is shown in Bond Patent 2,208,623. Any other means for obtaining these prediction voltages may be used.

These prediction voltages are added by being connected in series, as shown. Since these voltages are derived from similar plural secondary windings of the same transformer, their phase relationships will all be in phase coincidence or phase opposition, so that they may be added arithmetically to produce the required resultant prediction voltage. The resultant is applied to the input of full wave demodulator 35 by means of transformer 36. The circuit of the demodulator of the present invention is shown in Fig. 2. The output of this demodulator 35 is a direct voltage whose amplitude corresponds to the amplitude of the input alternating voltage and whose polarity corresponds to the phase of the input voltage.

The output direct voltage from demodulator 35 is connected in series with the direct-time-of-flight prediction voltage to give the total prediction voltage.

The prediction potentiometer 37 is energized with direct current. The energizing potential for potentiometer 37 is obtained from alternating supply line 30 by means of transformer 38a feeding full wave rectifier 38 having filter choke 39 and filter condenser 40. Choke 39 may be replaced by the field winding of speed generator 7 when an electromagnet field is used for that generator. In this way, since all the prediction circuit voltages are derived from the same source, namely, source 30, any fluctuation in source voltage will have equal proportional effect on all voltages, so that the circuit as a whole is independent of source voltage fluctuations. This arises from the fact that the balancing voltage from potentiometer 37 varies in the same way as the prediction voltages upon any change in supply voltage.

In operation, potentiometer 37 is rotated until the voltage between its arm and its center point balances the total prediction voltage. This is done by connecting the total prediction voltage and the potentiometer voltage in opposition across the input of device 41, which includes a D. C. amplifier, a modulator which converts reversible polarity D. C. into reversing phase A. C., and an A. C. amplifier. Either or both the D. C. and A. C. amplifier may include rate circuits for insuring dead-beat and anti-hunting operation of prediction motor 42. Also, the A. C. circuits in device 41 may include proper phase shifting apparatus to cause the voltage output to be in quadrature with the voltage of line 30, to insure proper operation of two-phase prediction motor 42.

The operation of this circuit is such as to position shaft 43 at the angle corresponding to the total prediction voltage.

Fig. 2 shows the full wave demodulator of my invention which is adapted for use with the circuit of Fig. 1. The reversible phase A. C. input is applied to the primary winding of transformer 46 which has a center-tapped secondary winding having two sections 47, 48. The voltage across section 47 is applied cophasally or in in-phase relation to grid 49 of twin-triode 50 and to grid 51 of tube 52. The voltage across section 48 is applied cophasally to grid 53 of tube 50 and to grid 54 of tube 52. Hence, the grids 49 and 53 of tube 50 are energized in phase opposition or in out-of-phase relation as are grids 51 and 54 of tube 52. Current limiting resistors 55 may be used. The cathodes of both tubes are connected together and to the center tap of the secondary winding of transformer 46. If desired, a fixed bias voltage may be inserted between points 56 and 57, or cathode bias resistors may be used in the cathode circuits of the two tubes.

The anodes 58 and 59 of tube 50 are energized in phase opposition from the secondary winding of a transformer 60 fed from the A. C. source 30. The center tap of this secondary winding is connected to the cathodes by load resistor 61, which is by-passed by filter condenser 62. Anodes 63, 64 of tube 52 are energized in similar fashion from transformer 65 and have a similarly connected load resistor 66 and filter condenser 67. Transformers 60 and 65 are so connected that anodes 58 and 64, whose corresponding grids are cophasally energized, are energized in phase opposition. Also, anodes 59 and 63 are energized in phase opposition.

Across load resistors 61 and 66 connected in series, there is connected a filter circuit 68 for filtering out A. C. components, leaving only pure rectified D. C. at output terminals 69, 70. This filter includes a choking transformer 71 having its primary winding in series with terminal 69 and its secondary winding in series with terminal 70. Either primary or secondary winding, or both, may be tuned to the frequency of the predominating A. C. component, which is twice the line frequency. A further by-pass condenser 72 is also used.

The input voltage to transformer 46 is of the same frequency as source 30, and is adjusted by any suitable means to be cophasal (or antiphasal) with the voltage of source 30.

Let it be assumed that the phase of the input to transformer 46 is such that, at a particular instant of time to be considered, grids 49 and 51 are positive with respect to their cathodes, while grids 53 and 54 are negative. Furthermore, let it be supposed that at this same instant, anodes 58 and 63 are positive with respect to their cathodes, and anodes 59 and 64 are negative.

Then anode 58 will conduct, since both it and its grid are positive. Anode 59 will not conduct, being negative. Anode 63 will not conduct, its grid 54 being negative. Anode 64 will not conduct, being negative. Accordingly, a voltage will appear only across resistor 61, making output terminal 69 negative with respect to terminal 70.

In the succeeding half-cycle from the instant of time considered above, grids 49 and 51 will be negative, grids 53 and 54 will be positive, anodes 58 and 63 will be negative and anodes 59 and 64 will be positive. Hence, only anode 59 will conduct, the remaining anodes and/or grids being negative. Again current will be passed through resistor 61, and the same polarity of D. C. output will be obtained.

If the input to transformer 46 should reverse phase, with respect to source 30, then, at one instant of time grids 49 and 51 would be negative, grids 53 and 54 would be positive, anodes 58 and 63 would be positive and anodes 59 and 64 would be negative. Under these conditions only anode 63 would conduct, yielding a D. C. output of opposite polarity from that of the case considered above.

On the succeeding half-cycle, all polarities would reverse, and only anode 64 would conduct.

Accordingly, the apparatus of Fig. 2 operates as a phase-sensitive, full wave rectifier or demodulator, suitable for use in the circuit of Fig. 1.

In Fig. 3 I have illustrated a modified form of full wave, phase-sensitive demodulator which is generally similar to that shown in Fig. 2. In this embodiment of my invention, the alternating voltage signal, which may be of variable amplitude as that derived from transformer 28 or, for example, from a manual controller such as controller 11 of Fig. 1 or a Selsyn signal generator and the like and which is to be demodulated, is applied across input taps 73, 74 and coupled to the grids of the triodes 75, 76, 77 and 78 through transformer 79. The plates 80 and 81 of tubes 75 and 76 are energized in out-of-phase relation through transformer 82 from a source of reference voltage 83 having the same frequency as the signal voltage applied to input 73, 74, while the grids 84, 85 thereof are likewise supplied with the input signal voltage in out-of-phase relation. Similarly, the plates 86 and 87 of tubes 77, 78 are energized in out-of-phase relation through the transformer 88 from the reference voltage source 83, and the signal voltage is applied in out-of-phase relation from the secondary of transformer 79 to the grids 89, 90 of these latter tubes. The transformer 79 comprises two center tapped secondaries 91 and 92, secondary 91 being connected to grids 84, 85 and secondary 92 to grids 89, 90. Filtering of the full wave demodulated or unidirectional voltage is obtained through the parallel inductance-capacitance or choke and condenser circuits indicated generally at 93 and 94 which are respectively connected in the plate circuits of tubes 75, 76 and 77, 78 and to opposite ends of the series connected output resistors 95 and 96. As shown, these series resistors are connected across the output taps 97, 98, and the tuned parallel choke and condenser filter circuits together with the by-pass condensers 99 serve substantially to eliminate alternating currents and mainly the most undesirable and ripple frequency or second harmonic in the output or across the output 97, 98.

In the circuit of Fig. 3, as compared to that of Fig. 2, it will be observed that a resistor 100 is connected between the point common to both cathode resistors 101 and 102 of tubes 75, 76 and 77, 78 and to the mid tap on the secondary 91 of transformer 79. Also, a similar resistor 103 is connected from the midpoint between cathode resistors 101 and 102 and the midpoint of secondary 92 of transformer 79. Hence, in this type of demodulator, a unidirectional signal voltage may be applied to the points A and B or across resistors 100 and 103. This voltage may be, for example, a voltage proportional to the speed of the servomotor applied in degenerative fashion for motor-damping purposes and which is derived from generator 104 driven by the servomotor controlled by the amplifier embodying this demodulator in a manner such as that shown in Fig. 4. The demodulator will then function to mix this unidirectional signal voltage and the alternating input signal voltage and to supply a demodulated or full wave rectified output voltage which is a function of the algebraic sum of the two signal voltages.

In Fig. 4, such a speed voltage generator is shown at 104 driven by servomotor 105 and having its output supplied to terminals A—B corresponding to those in Fig. 3. Condensers may be inserted in the generator connections to provide a speed voltage only under transient or speed varying conditions. The variable signal voltage is derived from signal source or generator 106 which may be of any type preferably providing a reversible phase, variable amplitude signal voltage. Generator 106 is connected to the input of demodulator 107 which may correspond to that shown in Fig. 2 or to that shown in Fig. 3 when mixing of the speed voltage therein is desired. An amplifier stage 108 is preferably interposed between the demodulator and servomotor. This amplifier stage may be a D. C. amplifier, or a modulator and A. C. amplifier or any combination thereof depending on the character of the servomotor.

Demodulators in practically all cases, require some filtering of the output. In the case of full wave demodulators, the reduced ripple content of the output permits of less filtering than does that of the half wave demodulator. Filtering ordinarily effects a time delay. Therefore, when demodulators are employed in servomotor control circuits where time delays must be guarded against or held to some prescribed minimum, restrictions on filtering and filter circuits become necessary in order that the response of the servo system shall conform to prescribed specifications. It should be evident that for servomotor control work, a full wave demodulator, and of course one of a phase-sensitive character, is desirable because it requires less filtering and therefore will provide a purer unidirectional voltage output with less delay than half wave demodulators.

In Figs. 1 and 2, tubes 4, 5, 38, 50 and 52 have been illustrated as being of the twin or duplex type. It is obvious that in each case two separate single tubes could equally well be used. Also, tubes 50, 52 and 75–78 need not be of the triode type, as shown, but may be of any type of amplifier tube incorporating a control grid.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A signal responsive circuit arrangement comprising, first, second, third and fourth non-linear current-conducting elements each capable of substantially unidirectional current conduction, means coupled thereto for supplying substantially equal alternating voltages to said four current-conducting elements, said supplying means being so coupled to said elements as to supply said first and third elements in the polarity for maximum conduction alternately with said second and fourth elements, means coupled to said four current-conducting elements for differentially varying the conductions through the first and second elements relative to those through the third and fourth elements, and intercoupling means including series-connected impedances in the supply current conduction circuits of said elements for providing a composite output voltage to which the currents through said four current-conducting devices contribute differentially according to the differential conduction variations, one side of all of said elements being connected together and to the common connection between said series-connected impedances and the other side of the first and fourth element being connected to one end of said series-connected impedances and the other side of the second and third elements being connected to the other end of said series-connected impedances.

2. A full wave, phase sensitive demodulator comprising first, second, third and fourth non-linear current conducting devices, each having a control element, means for supplying alternating currents to said devices, an output circuit to which the first and second of said devices are connected to contribute in aiding relation but in opposition to the third and fourth of said devices, means for varying the potentials of the control elements of the first and fourth of said devices in one direction and for varying the potential of the control elements of the second and third of said devices in the opposite sense in response to a unidirectional signal, and means for varying the potentials of the control elements of the first and fourth of said devices in the same phase relation while varying the potentials of the second and third of said devices in like phase relation but opposite to the first and fourth of said devices in response to an alternating signal, said output circuit comprising intercoupled impedances to provide a composite output voltage to which the current through the four devices contribute differentially.

3. A full wave, phase sensitive demodulator comprising transformer means having a primary input winding and first, second, third and fourth secondary output windings, first, second, third and fourth non-linear current conducting elements respectively connected to said secondary transformer windings and operable to control the direction of maximum current conduction therethrough, the first and second windings and connected non-linear elements being connected to provide currents flowing in the same direction and opposite to the currents flowing through the third and fourth windings and connected non-linear elements, an alternating voltage source connected to said input winding, the windings of said transformer means and said non-linear elements being so constructed, correlated and arranged as to polarize the first and third non-linear elements for maximum conductivity alternately with said second and fourth non-linear elements, means for applying the same signal voltage to the non-linear elements for varying the current conduction through the first and second non-linear elements relative to the current conduction through the third and fourth non-linear elements, and intercoupling means connecting the first and second of said secondary output windings with the third and fourth thereof including intercoupled impedances respectively connected, one in the circuit of the first and fourth conducting elements and the other in the circuit of the second and third and to which the currents through the four non-linear elements contribute in a differential fashion.

4. A full wave, phase sensitive demodulator of the character recited in claim 3 wherein the non-linear current conducting elements each comprise an electron discharge device having a cathode, an anode and a control electrode, and in which the means for applying the signal voltage to the non-linear elements comprises means for applying said voltage to the control electrodes of said devices.

5. A full wave, phase sensitive demodulator comprising transformer means having a primary input winding and first, second, third and fourth secondary output windings, first, second, third and fourth non-linear current conducting elements respectively connected to said secondary transformer windings and operable to control the direction of maximum current conduction therethrough, the first and second windings and connected non-linear elements being connected to provide currents flowing in the same direction and opposite to the currents flowing through the third and fourth windings and connected non-linear elements, an alternating voltage source connected to said input winding, the windings of said transformer means and said non-linear elements being so constructed, correlated and arranged as to polarize the first and third non-linear elements for maximum conductivity alternately with said second and fourth non-linear elements, means for applying a voltage to the non-linear elements for varying the current conduction through the first and second non-linear elements relative to the current conduction through the third and fourth non-linear elements, intercoupling means connecting the first and second of said secondary output windings with the third and fourth thereof including intercoupled impedances respectively connected, one in the circuits of the first and fourth conducting element and the other in the circuits of the second and third and to which the currents through the four non-linear elements contribute in a differential fashion, and means for applying a third voltage to said non-linear elements to vary the conductivity of the first and fourth thereof relative to the second and third.

6. A full wave, phase sensitive demodulator comprising transformer means having a primary input winding and first, second, third and fourth secondary output windings, first, second, third and fourth non-linear current conducting elements respectively connected to said secondary transformer windings and operable to control the direction of the maximum current conduction therethrough, the first and second windings and connected non-linear elements being connected to provide currents flowing in the same direction and opposite to the currents flowing through the third and fourth windings and connected non-linear elements, an alternating voltage source connected to said input winding, the windings of said transformer means and said non-linear elements being so constructed, correlated and arranged as to polarize the first and third non-linear elements for maximum conductivity alternately with said second and fourth non-linear elements, signal input transformer means including a primary winding and two secondary windings each having a mid tap, said secondary windings being connected to apply a control voltage to the non-linear elements so as to vary the current conduction through the first and second thereof relative to the current conduction through the third and fourth, impedance means connected between the mid taps of said secondary input transformer windings across which a unidirectional control signal may be applied, and intercoupling means including a pair of impedances connected in series relation and one thereof being connected in the current conduction circuit of the first and fourth non-linear element and the other in the current conduction circuit of the second and third non-linear element whereby to provide a differential voltage thereacross dependent upon the outputs of all of said non-linear elements.

7. A full wave, phase sensitive demodulator comprising transformer means having a primary input winding and first and second center tap secondary output windings, first, second, third and fourth non-linear current conductive elements, the first and second of said elements being connected to opposite ends of the first secondary winding and the third and fourth of said elements being connected respectively to the ends of the second secondary winding, output impedance means connected between the center taps of the secondary windings of said transformer means, and signal input transformer means responsive to an alternating signal voltage and comprising a primary winding and two secondary windings coupled to said four current conducting elements for differentially varying the conductions through the first and second of said elements relative to the conductions through the third and fourth thereof.

8. In a servomotor system comprising a source of alternating signal voltage, a servomotor and an amplifier connected with said control voltage source for controlling the direction and rate of operation of said servomotor in accordance with the phase sense and amplitude of said control voltage, said amplifier including a full wave, phase sensitive demodulator comprising first, second, third and fourth non-linear current-conducting elements each capable of substantially unidirectional current conduction, means coupled thereto for supplying substantially equal alternating voltages to said four current-conducting elements, said supplying means being so coupled to said elements as to supply said first and third elements in the polarity for maximum conduction alternately with said second and fourth elements, means connected with said signal voltage source and coupled to said four current-conducting elements for differentially varying the conduction through the first and fourth elements relative to those through the second and third elements, and intercoupling means including series-connected impedances in the supply current conduction circuits of said elements for providing a composite output voltage to which the currents through said four current-conducting devices contribute differentially according to the differential conduction variations, one of said series-connected impedances being connected in the current conduction circuits of the first and fourth non-linear elements and the other of said series-connected impedances being connected in the current conduction circuit of the third and fourth non-linear elements, and the opposite ends of said series-connected impedances being connected to supply the voltage across said series-connected impedances in controlling relation to said servomotor.

9. In a servomotor system comprising a source of alternating control voltage, a servomotor and an amplifier connected with said control voltage source for controlling the direction and rate of operation of said servomotor in accordance with the phase sense and amplitude of said control voltage, said amplifier including a full wave, phase sensitive demodulator comprising transformer means having a primary input winding and first, second, third and fourth secondary output windings, first, second, third and fourth non-linear current conducting elements respectively connected to said secondary transformer windings and operable to control the direction of maximum current conduction therethrough, the first and second windings and connected non-linear elements being connected to provide currents flowing in the same direction and opposite to the current flowing through the third and fourth windings and connected non-linear elements, an alternating voltage source connected to said input winding, the windings of said transformer means and said non-linear elements being so constructed, correlated and arranged as to polarize the first and third non-linear elements for maximum conductivity alternately with said second and fourth non-linear elements, signal input transformer means connected with said control voltage source and including a primary winding and two secondary windings each having a mid tap, said secondary windings being connected to apply a control voltage to the non-linear elements so as to vary the current conduction through the first and second thereof relative to the current conduction through the third and fourth, impedance means connected between the mid taps of said secondary input transformer windings across which a unidirectional control signal may be applied, and intercoupling means including a pair of impedances connected in series relation and one thereof being connected in the current conduction circuit of the first and fourth non-linear element and the other in the current conduction circuit of the second and third non-linear element whereby to provide a differential voltage thereacross dependent upon the outputs of all of said non-linear elements, the output of said demodulator being connected to control said servomotor, and a unidirectional signal voltage generator connected across the impedance means coupled across the mid taps of the secondary windings of the signal input transformer of said demodulator.

RAYMOND C. GOERTZ.

REFERENCES CITED

The following references are of record in the file of this patent:

UNITED STATES PATENTS

| Number | Name | Date |
|---|---|---|
| 2,218,477 | Parker et al. | Oct. 15, 1940 |
| 2,276,752 | Willis | Mar. 17, 1942 |
| 2,396,187 | Means et al. | Mar. 5, 1946 |